United States Patent
Jou

(10) Patent No.: US 10,924,741 B2
(45) Date of Patent: Feb. 16, 2021

(54) METHOD OF DETERMINING QUANTIZATION PARAMETERS

(71) Applicant: NOVATEK Microelectronics Corp., Hsin-Chu (TW)

(72) Inventor: Fandi Jou, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/384,907

(22) Filed: Apr. 15, 2019

(65) Prior Publication Data
US 2020/0329244 A1 Oct. 15, 2020

(51) Int. Cl.
| H04N 19/89 | (2014.01) |
| H04N 19/176 | (2014.01) |
| H04N 19/126 | (2014.01) |
| H04N 19/139 | (2014.01) |
| H04N 19/189 | (2014.01) |

(52) U.S. Cl.
CPC ......... *H04N 19/126* (2014.11); *H04N 19/139* (2014.11); *H04N 19/176* (2014.11); *H04N 19/189* (2014.11); *H04N 19/89* (2014.11)

(58) Field of Classification Search
CPC .. H04N 19/126; H04N 19/139; H04N 19/176; H04N 19/189; H04N 19/89
See application file for complete search history.

(56) References Cited

U.S. PATENT DOCUMENTS

| 2011/0292998 A1* | 12/2011 | Ohgose | H04N 19/176 |
| | | | 375/240.08 |
| 2019/0156213 A1* | 5/2019 | Tsuzuku | H03M 7/30 |

* cited by examiner

*Primary Examiner* — Tsion B Owens
(74) *Attorney, Agent, or Firm* — Winston Hsu

(57) ABSTRACT

A method of determining quantization parameters includes the steps of: receiving a block of image data; calculating a general variance of the block of image data; calculating a plane-based variance of the block of image data by subtracting an image moment of the block of image data from the general variance; and determining a quantization parameter for the block of image data according to the plane-based variance.

16 Claims, 5 Drawing Sheets

METHOD OF DETERMINING QUANTIZATION PARAMETERS

BACKGROUND OF THE INVENTION

1. Field of the Invention

The present invention relates to a method for a video encoder, and more particularly, to a method of determining quantization parameters for a video encoder.

2. Description of the Prior Art

Smart encoding technologies are widely applied in modern video encoding schemes. The smart encoding applies different compression rates for image blocks having different features, where those images more insensitive to human eyes are compressed with higher compression rates to reduce the data quantities, and those images more sensitive to human eyes are compressed with lower compression rates to preserve higher fidelity. The compression rates may be described by quantization parameters (QPs). In detail, a larger QP represents a higher compression rate which leads to smaller data quantities but accompanied by larger distortion.

Variance adaptive quantization (VAQ) is an image encoding algorithm commonly used in currently available video encoding devices such as x264 and x265 encoders. The VAQ allows the QPs to be obtained based on variances of blocks of image data, such that each block may be allocated with an appropriate QP, so as to achieve smart encoding. However, the variance of the block of image data may not correctly reflect the visual sensitivity of the block. For example, a block having a gradient color or brightness gradation is highly sensitive to human eyes, but is usually allocated with higher quantization parameters, resulting in lower image quality easily sensed by a human in the gradient area. Thus, there is a need for improvement over the prior art.

SUMMARY OF THE INVENTION

It is therefore an objective of the present invention to provide a plane-based variance adaptive quantization (VAQ), which improves the image quality in the gradient areas of the image.

An embodiment of the present invention discloses a method of determining quantization parameters. The method comprises the steps of: receiving a block of image data; calculating a general variance of the block of image data; calculating a plane-based variance of the block of image data by subtracting an image moment of the block of image data from the general variance; and determining a quantization parameter for the block of image data according to the plane-based variance.

Another embodiment of the present invention discloses a method of determining quantization parameters. The method comprises the steps of: receiving a block of image data; calculating a plane-based variance of the block of image data by using an image moment of the block of image data; and determining a quantization parameter for the block of image data according to the plane-based variance.

These and other objectives of the present invention will no doubt become obvious to those of ordinary skill in the art after reading the following detailed description of the preferred embodiment that is illustrated in the various figures and drawings.

DETAILED DESCRIPTION

Figure 1B:
FIGS. 1A and 1B are schematic diagrams of allocation of quantization parameters based on the variance adaptive quantization.
Figure 1A:
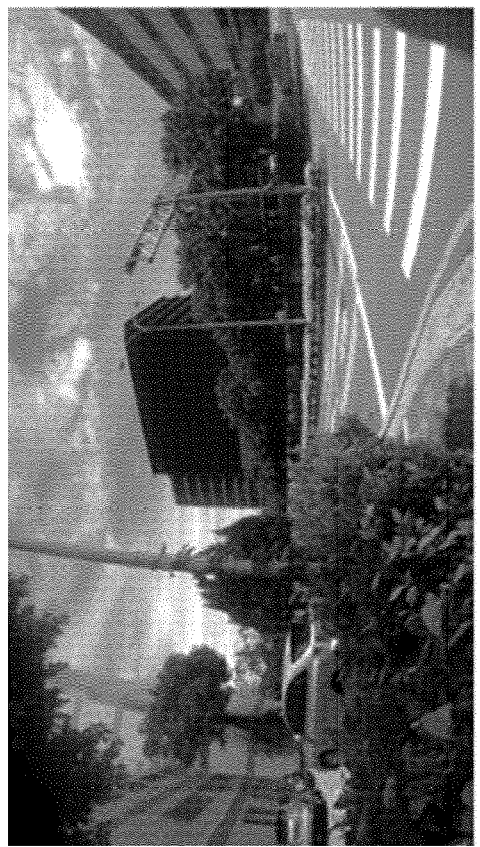

Please refer to FIGS. 1A and 1B, which are schematic diagrams of allocation of quantization parameters (QPs) based on the variance adaptive quantization (VAQ). With the VAQ, the QPs are allocated according to the texture complexity of each block. Since the image is compressed by taking each block as a unit, each block is allocated with a QP. FIG. 1A illustrates an exemplary picture, and FIG. 1B illustrates allocation of QPs in this picture, where the blocks allocated with smaller QPs are denoted by lighter colors and the blocks allocated with larger QPs are denoted by darker colors. Due to the VAQ scheme, it is preferable to use appropriate QPs for different blocks, so that each block in an image frame may be applied with different QPs. As shown in FIGS. 1A and 1B, a block with higher texture complexity usually includes an edge of an object, and thus may have a higher variance of image data. Since the edge of an object is visually definite and a user may not easily discover a small difference on the edge, this block is usually allocated with a higher QP; hence, the data quantities may be saved by using a higher compression rate in the block. On the other hand, a block with lower texture complexity is usually in a flat area, and thus may have a lower variance of image data. Since the flat area is visually sensitive and any variation or distortion on the flat area is easily observed by a viewer, this block is usually allocated with a lower QP; hence, the image qualities in the flat area may be preserved by using a lower compression rate in the block.

As mentioned above, the variance of the block of image data may not correctly reflect the visual sensitivity of the block, especially the block having a gradient image or color. More specifically, in a gradient area where image data increases or decreases gradually, the variance of the block may be significantly larger than the variance of flat area. The larger variance results in larger QPs allocated to the blocks in the gradient area. However, the gradient color is sensitive to human eye and distortions in the gradient area may be easily observed by a viewer. Therefore, the general VAQ scheme cannot determine a proper QP for the blocks in the gradient area.

In order to solve this problem, the present invention provides a plane-based VAQ, which improves the general VAQ to obtain more appropriate QPs for the blocks of image data, especially the blocks having a gradient image or color. According to the plane-based VAQ, the variance of the gradient area blocks may be calculated to be closer to the variance of the flat area blocks.

Figure 2:
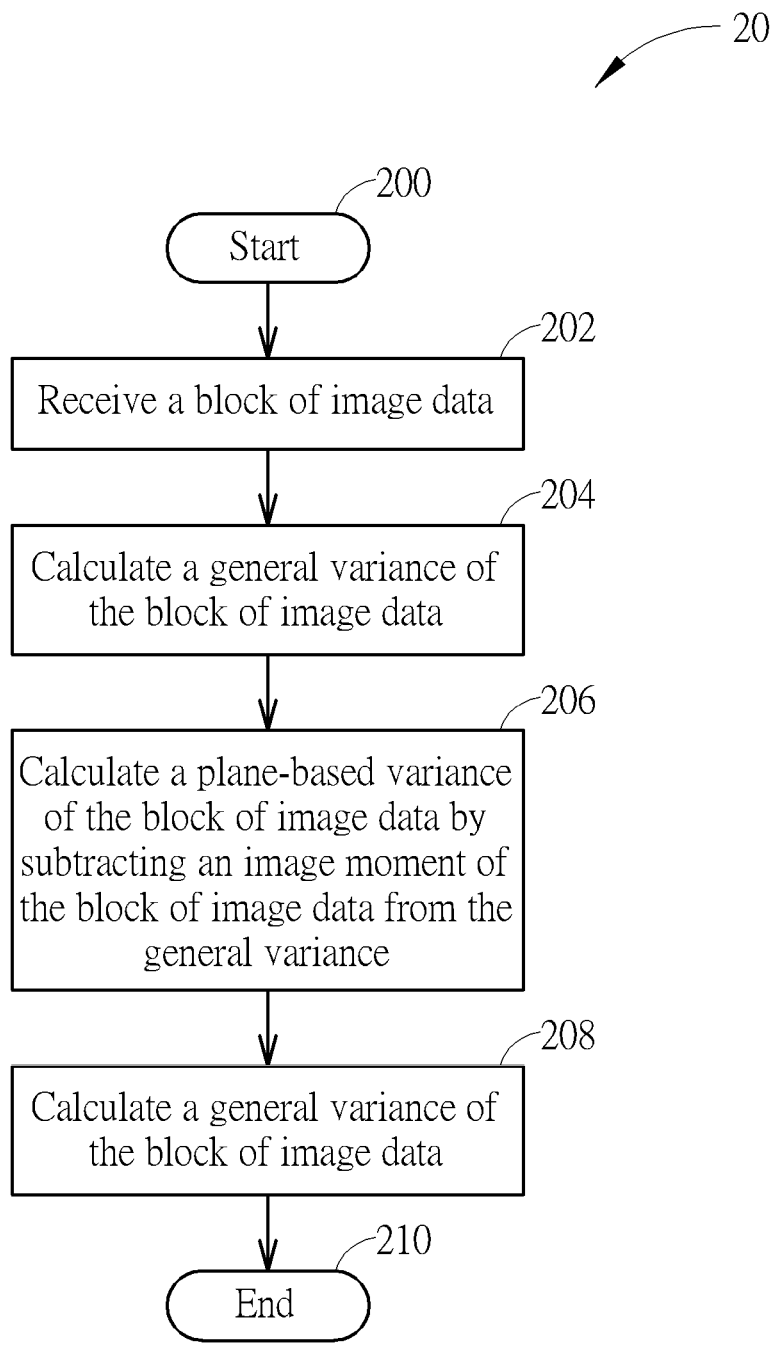
FIG. 2 is a flowchart of a process according to an embodiment of the present invention.

Please refer to FIG. 2, which is a flowchart of a process 20 according to an embodiment of the present invention. The process 20 may be implemented in a video encoder, for determining the QP for each block of image data. As shown in FIG. 2, the process 20 includes the following steps:

Step 200: Start.

Step 202: Receive a block of image data.

Step 204: Calculate a general variance of the block of image data.

Step 206: Calculate a plane-based variance of the block of image data by subtracting an image moment of the block of image data from the general variance.

Step 208: Determine a QP for the block of image data according to the plane-based variance.

Step 210: End.

According to the process 20, the video encoder may receive a block of image data and calculate a general variance of the block of image data. The general variance refers to the average of difference values of pixel data correlated to the mean of the block of image data. Subsequently, a plane-based variance of the block of image data is calculated, where an image moment of the block of image data is subtracted from the general variance to obtain the plane-based variance. The image moment may reflect an image gradient in the block of image data. The video encoder then determines a QP for the block according to the plane-based variance, and then allocates the QP to the block for follow-up compression operations.

Since the plane-based variance includes information of the image moment associated with the image gradient or color gradient, the QP obtained based on the plane-based variance is determined in consideration of the gradient. As mentioned above, image quality of the gradient color is sensitive to human eye as similar to the flat area; hence, the operation of subtracting the image moment allows the value of the plane-based variance to be closer to the value of variance in the flat area (i.e., small variance). In general, when the plane-based variance of the block has a smaller value, the QP for the block will be determined to have a smaller value, which allows the block of image to be compressed with a lower compression rate to preserve higher fidelity.

Figure 3A:
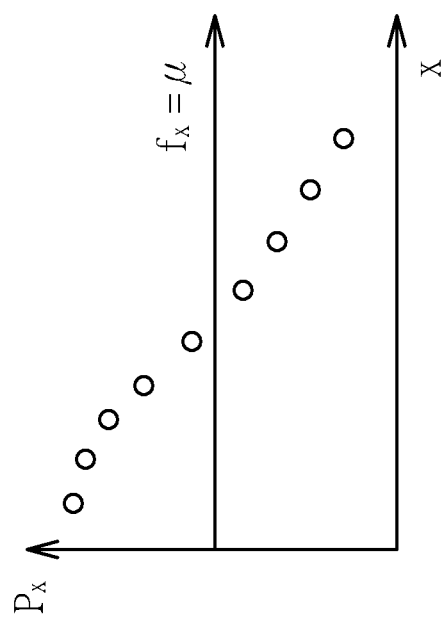
FIG. 3A is a schematic diagram of calculating the general variance of a block of pixel data.

Please refer to FIG. 3A, which is a schematic diagram of calculating the general variance V of a block of pixel data $P_x$. Each pixel data $P_x$ may be a gray scale value of a color in the corresponding pixel or subpixel in the block. As shown in FIG. 3A, to facilitate the illustration, a 1-dimensional (1D) block is taken as an example, where the pixel data $P_x$ have a gradient distribution and have a mean value $\mu$. The general variance V of the block of pixel data $P_x$ is the average of difference values correlated to the mean value of the block of pixel data $P_x$, and may be calculated as follows:

$$V = E[(P_x - f_x)^2]$$
$$= E[(P_x - \mu)^2]$$
$$= E[P_x^2] - \mu^2.$$

Figure 3B:
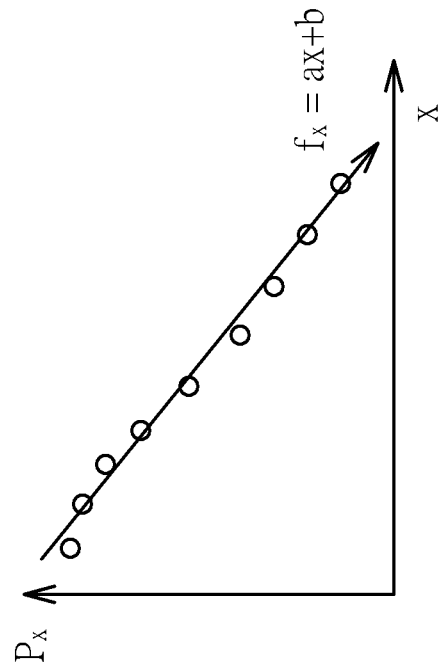
FIG. 3B is a schematic diagram of calculating the plane-based variance of the block of pixel data.

Please refer to FIG. 3B, which is a schematic diagram of calculating the plane-based variance $V_{pb}$ of the block of pixel data $P_x$. The plane-based variance $V_{pb}$ is the average of difference values of pixel data $P_x$ correlated to a function other than the mean value $\mu$ of the block of pixel data $P_x$. More specifically, the function may be a straight line denoting the minimum mean square error (MMSE) estimator ($f_x$=ax+b) of the block of pixel data $P_x$. The MMSE estimator may reflect the trend of gradient in the block. The plane-based variance $V_{pb}$ of the block of pixel data $P_x$ may be calculated as follows:

$$V_{pb} = E[(P_x - f_x)^2]$$
$$= E[(P_x - ax - b)^2]$$
$$= E[P_x^2] - \mu^2 - m \cdot E[x \cdot P_x]^2.$$

As can be seen, the plane-based variance $V_{pb}$ and the general variance V have a difference $m \cdot E[x \cdot P_x]^2$, which is the image moment of the block of pixel data $P_x$. In an embodiment, the general variance V may be calculated and obtained as $E[P_x^2]-\mu^2$, and then the plane-based variance $V_{pb}$ may be obtained by subtracting the image moment $m \cdot E[x \cdot P_x]^2$ from the general variance V, as the process 20 shown above. Note that m is a moment parameter capable of controlling the correlation of the image gradient in the block with the QP value. In general, the value of the moment parameter may be a variable within a range from 0 to approximately 3. When the moment parameter m is approximately equal to 3, the gradient image is fully considered for the determination of QP. When the moment parameter m is equal to 0, the gradient image is not considered for the determination of QP, and hence the plane-based variance $V_{pb}$ is equal to the general variance V. In an embodiment, the moment parameter m may be controlled or adjusted to have an appropriate value between 0 and 3 according to system requirements, e.g., according to whether the gradient image is considered and the weighting of gradient features on the determination of QP.

In the above embodiment, the plane-based variance $V_{pb}$ is obtained by subtracting the image moment from the general variance V; while in another moment, the plane-based variance $V_{pb}$ may be calculated directly without calculating the general variance V. In fact, the plane-based variance $V_{pb}$ may be calculated by any method with the usage of image moment; that is, the calculation result of the plane-based variance $V_{pb}$ may have a factor associated with the image moment, no matter how the plane-based variance $V_{pb}$ is obtained. For example, the plane-based variance $V_{pb}$ may be calculated by directly using the formula $V_{pb}=E[(P_x-ax-b)^2]$, where the term ax−b is a factor associated with the image moment.

Please note that the above concepts of calculating the general variance and the plane-based variance may be extended to a general block having 2-dimensional (2D) pixel data. As for an N×N block with pixel data P (x,y), the general variance V may be obtained as follows:

$$V = \frac{1}{N \times N} \sum_{x,y} [(P(x, y) - f(x, y)]^2;$$

wherein the function $f(x,y)$ is the mean of the pixel data P(x,y) in the block and equal to:

$$f(x, y) = \frac{1}{N \times N} \sum_{x,y} P(x, y).$$

Based on the calculations similar to those in the 1D example as mentioned above, it can be shown that:

$$V = \frac{1}{N \times N} \sum_{x,y} P(x, y)^2 - \left( \frac{1}{N \times N} \sum_{x,y} P(x, y) \right)^2.$$

Similarly, in the N×N block with pixel data P(x,y), the plane-based variance $V_{pb}$ is obtained as follows:

$$V_{pb} = \frac{1}{N \times N} \sum_{x,y} [(P(x, y) - f(x, y)]^2;$$

wherein the function $f(x,y)$ may be the MMSE estimator of pixel data P(x,y), which may be represented by:

$$f(x,y) = \alpha x + \beta y + \gamma.$$

Based on the calculations similar to those in the 1D example as mentioned above, it can be shown that:

$$V_{pb} = V - \frac{3}{N^4(N^2-1)}\left(\sum_{x,y} xP(x, y)\right)^2 -$$

$$\frac{3}{N^4(N^2-1)}\left(\sum_{x,y} yP(x, y)\right)^2$$

$$= \left(N^6 V - \frac{3N^2}{(N^2-1)}\left(\sum_{x,y} xP(x, y)\right)^2 -\right.$$

$$\left.\frac{3N^2}{(N^2-1)}\left(\sum_{x,y} yP(x, y)\right)^2\right)\bigg/ N^6$$

$$= \left(N^6 V - m_1\left(\sum_{x,y} xP(x, y)\right)^2 - m_2\left(\sum_{x,y} yP(x, y)\right)^2\right)\bigg/ N^6.$$

As cab be seen, the plane-based variance $V_{pb}$ may be obtained by subtracting a first image moment along X direction and subtracting a second image moment along Y direction from the general variance V, where the first image moment is equal to a first raw image moment $\Sigma_{x,y} xP(x,y)$ along x direction multiplied by a first moment parameter $m_1$, and the second image moment is equal to a second raw image moment $\Sigma_{x,y} yP(x,y)$ along y direction multiplied by a second moment parameter $m_2$. According to the above formula, the values of the moment parameters $m_1$ and $m_2$ may be equal to $$\frac{3N^2}{N^2-1},$$

where the gradient image is fully considered for the determination of QP. If N is equal to 64, the maximum value of the moment parameters $m_1$ and $m_2$ may be $$\frac{3 \times 4096}{4095},$$

which approximately equals 3.0007326. In the embodiments of the present invention, the values of the moment parameters $m_1$ and $m_2$ may be set to any possible values, to control the correlation of the image gradient in the block with the QP. For example, in an embodiment, each of the values of the moment parameters $m_1$ and $m_2$ may be set to be within the range from 0 to $3N^2/N^2-1$, depending on the weighting of gradient features. In another embodiment, the values of the moment parameters $m_1$ and $m_2$ may be set to be within the range from 0 to 3 for simplicity.

Figure 4A:
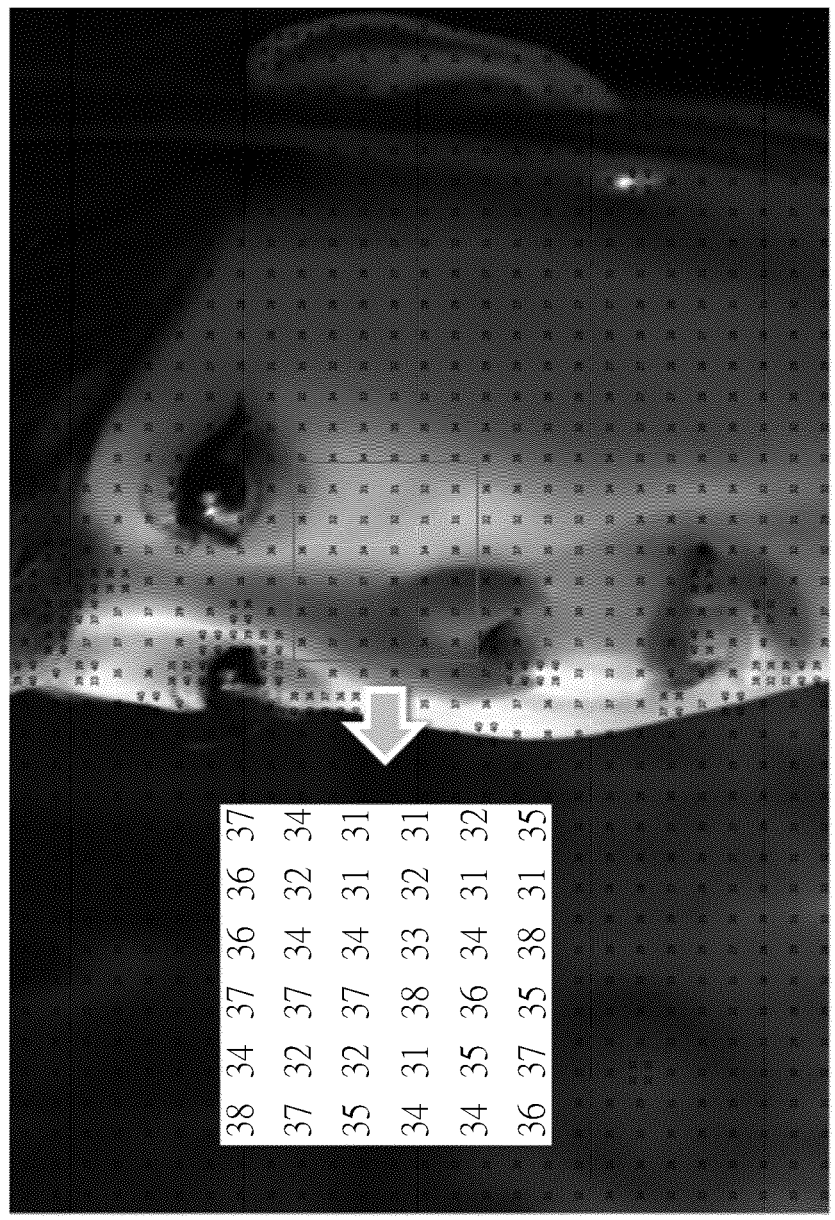
FIGS. 4A and 4B are schematic diagrams of the quantization parameter allocation in an exemplary picture.
Figure 4B:
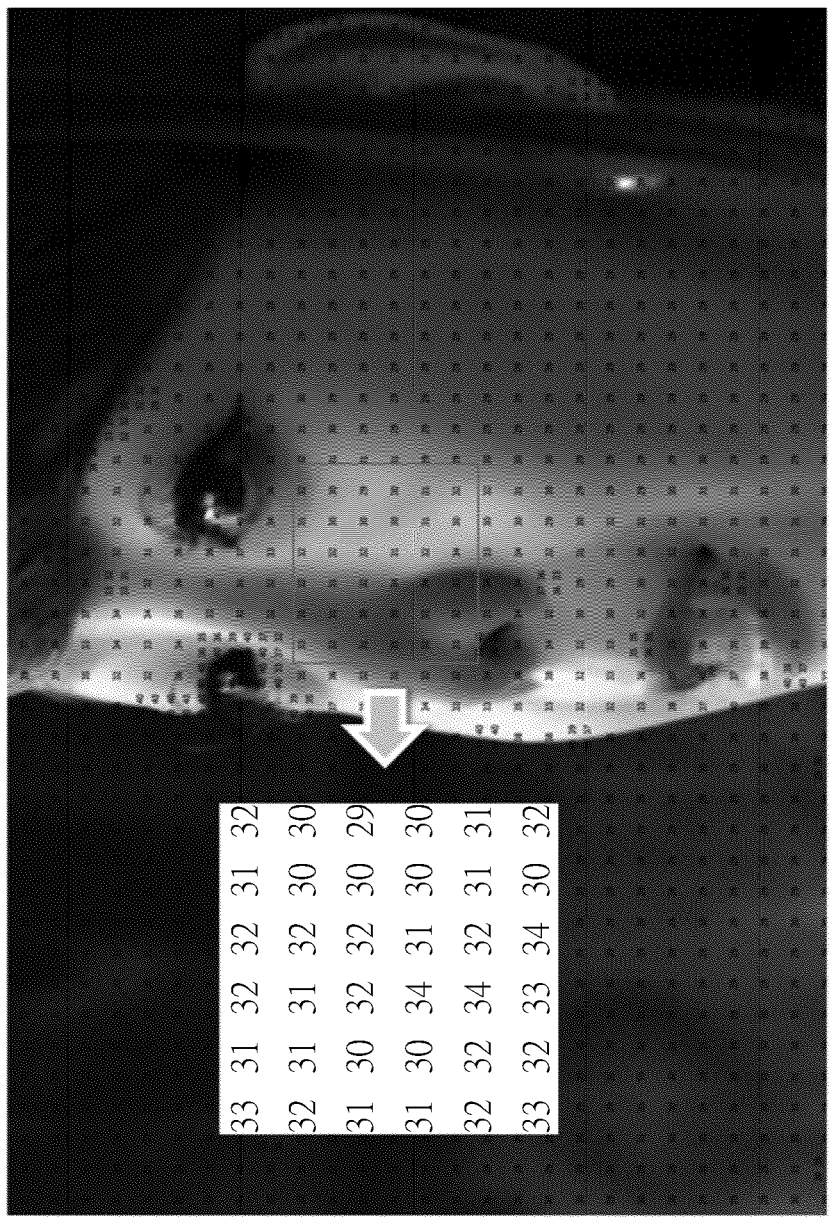

Based on the plane-based VAQ, the QPs may be determined to have lower values for gradient color areas. Please refer to FIGS. 4A and 4B, which are schematic diagrams of the QP allocation in an exemplary picture. FIG. 4A illustrates the picture where the QPs are determined based on the general VAQ, and FIG. 4B illustrates the same picture where the QPs are determined based on the plane-based VAQ. The pictures obtained from the general VAQ and the plane-based VAQ have slight difference on the gradient areas such as the nose and the face near the nose, and this area is highlighted to show the QPs. As shown in FIG. 4A, the QPs in this gradient area range from 31 to 37 as determined based on the general VAQ. As shown in FIG. 4B, the QPs in this gradient area range from 29 to 34 as determined based on the plane-based VAQ. As can be seen, the plane-based VAQ of the present invention provides smaller QP values for the gradient area (closer to the QP values in the flat area), so as to improve the image quality in the gradient area that may be sensitive to human eye.

Please note that the present invention aims at providing a method of determining QPs according to the plane-based VAQ in consideration of the gradient image. Those skilled in the art may make modifications and alternations accordingly. For example, in the above embodiments, the function for calculating the difference values of the plane-based variance is a straight line representing the MMSE estimator. In another embodiment, the function may be a curve as being denoted by a 2-moment expression. In addition, the plane-based VAQ of the present invention may be implemented in any type of video encoder. As long as a video encoder is capable of compressing an image by allocating QPs to multiple blocks of the image, the video encoder may use the plane-based VAQ to determine the QP values, no matter which video/image encoding standard is applied. Further, the blocks may be arranged in any manners, and the determined QP values are applicable to any block size. For example, as shown in FIGS. 4A and 4B, each block may have different sizes according to the encoding scheme, and the QP allocated to every block may be determined according to the plane-based VAQ.

To sum up, the present invention provides a method of determining QPs for blocks of image data according to the plane-based VAQ. The plane-based variance may be calculated by subtracting the image moment(s) from the general variance. The image moment(s) may reflect the image gradient in the block of image data. Therefore, the plane-based VAQ allows the QP values obtained in the gradient area to be closer to the QP values obtained in the flat area; hence, the gradient area, in which variations and distortions may be sensitive to human eyes, may be allocated with lower QPs, so as to be compressed with lower compression rates to preserve higher fidelity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining quantization parameters, comprising:
   receiving a block of image data;
   calculating a first variance of the block of image data;
   calculating a second variance of the block of image data by subtracting an image moment of the block of image data from the first variance; and determining a quantization parameter for the block of image data according to the second variance;
wherein the image moment reflects an image gradient in the block of image data.

2. The method of claim 1, wherein the second variance is an average of difference values of the block of image data correlated to a mathematical function other than a mean of the block of image data.

3. The method of claim 2, wherein the mathematical function is a minimum mean square error estimator of the block of image data.

4. The method of claim 1, wherein the step of calculating the second variance of the block of image data by subtracting the image moment of the block of image data from the first variance comprises:
subtracting a first raw image moment along a first direction multiplied by a first moment parameter and a second raw image moment along a second direction multiplied by a second moment parameter from the first variance, to obtain the second variance.

5. The method of claim 4, further comprising:
setting values of the first moment parameter and the second moment parameter to control a correlation of an image gradient in the block of image data with the quantization parameter.

6. The method of claim 5, wherein the block of image data is an N×N block, and each of the values of the first moment parameter and the second moment parameter is within a range from 0 to m, wherein m is equal to:

$$m = \frac{3N^2}{N^2 - 1}.$$

7. The method of claim 5, wherein each of the values of the first moment parameter and the second moment parameter is within a range from 0 to 3.

8. The method of claim 1, further comprising:
determining that the quantization parameter for the block of image data has a first value when the second variance has a first value; and
determining that the quantization parameter for the block of image data has a second value smaller than the first value of the quantization parameter when the second variance has a second value smaller than the first value of the second variance.

9. A method of determining quantization parameters, comprising:
receiving a block of image data;
calculating a second variance of the block of image data by using an image moment of the block of image data; and
determining a quantization parameter for the block of image data according to the second variance;
wherein the image moment reflects an image gradient in the block of image data.

10. The method of claim 9, wherein the second variance is an average of difference values of the block of image data correlated to a mathematical function other than a mean of the block of image data.

11. The method of claim 10, wherein the mathematical function is a minimum mean square error estimator of the block of image data.

12. The method of claim 9, wherein the step of calculating the second variance of the block of image data by using the image moment of the block of image data comprises:
calculating a first variance of the block of image data; and
subtracting a first raw image moment along a first direction multiplied by a first moment parameter and a second raw image moment along a second direction multiplied by a second moment parameter from the first variance, to obtain the second variance.

13. The method of claim 12, further comprising:
setting values of the first moment parameter and the second moment parameter to control a correlation of an image gradient in the block of image data with the quantization parameter.

14. The method of claim 13, wherein the block of image data is an N×N block, and each of the values of the first moment parameter and the second moment parameter is within a range from 0 to m, wherein m is equal to:

$$m = \frac{3N^2}{N^2 - 1}.$$

15. The method of claim 13, wherein each of the values of the first moment parameter and the second moment parameter is within a range from 0 to 3.

16. The method of claim 9, further comprising:
determining that the quantization parameter for the block of image data has a first value when the second variance has a first value; and
determining that the quantization parameter for the block of image data has a second value smaller than the first value of the quantization parameter when the second variance has a second value smaller than the first value of the second variance.

* * * * *